Jan. 18, 1966   O. A. MORGENSTERN   3,230,543
DATA PROJECTOR SLIDE ASSEMBLY

Filed May 15, 1962  2 Sheets-Sheet 1

INVENTOR.
OSCAR A. MORGENSTERN
BY
OSTROLENK, FABER, GERB & SOFFEN
ATTORNEYS

Jan. 18, 1966　　O. A. MORGENSTERN　　3,230,543
DATA PROJECTOR SLIDE ASSEMBLY
Filed May 15, 1962　　2 Sheets-Sheet 2
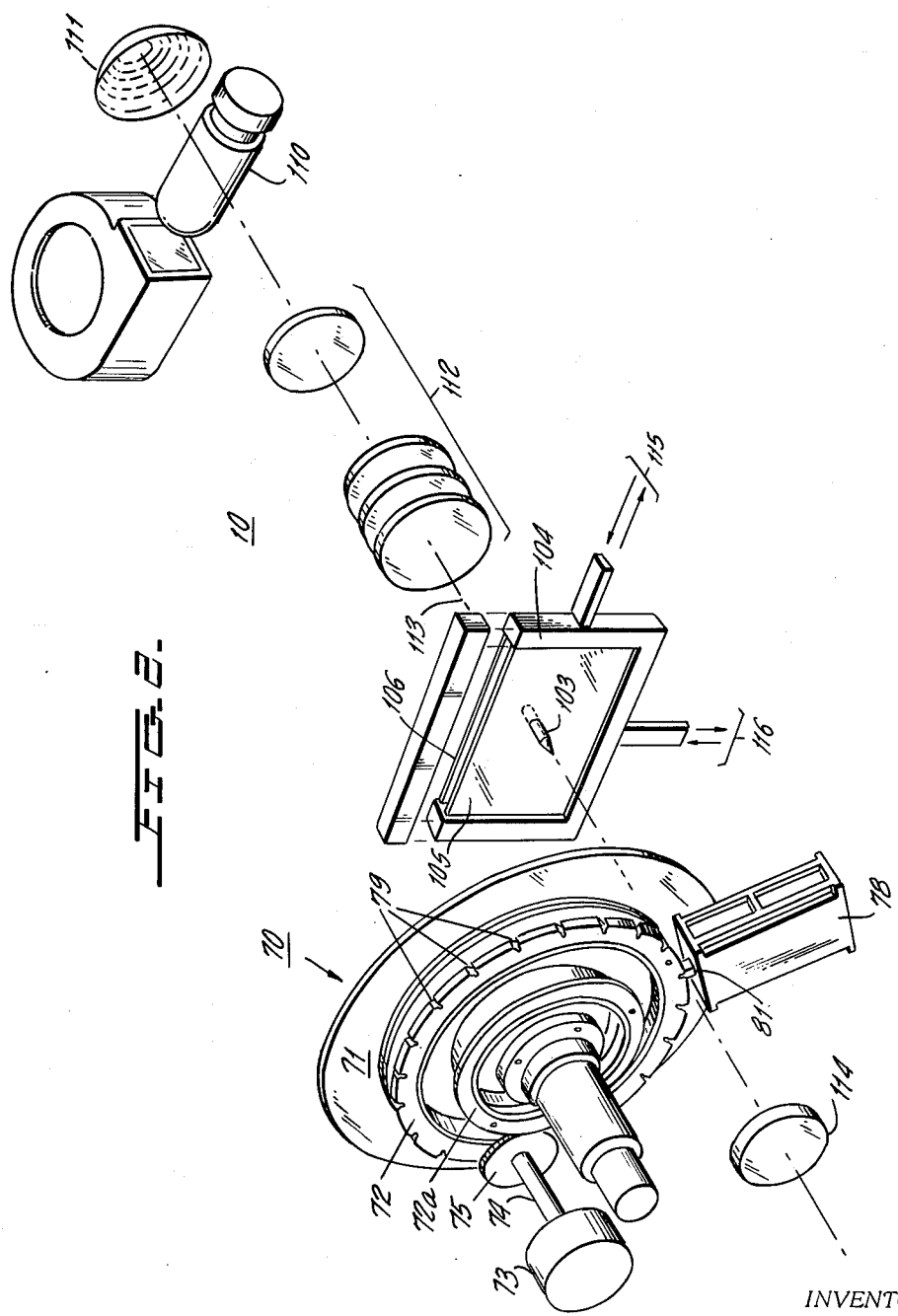
INVENTOR.
OSCAR A. MORGENSTERN
BY
OSTROLENK, FABER, GERB & SOFFEN
ATTORNEYS

# United States Patent Office 3,230,543
Patented Jan. 18, 1966

3,230,543
DATA PROJECTOR SLIDE ASSEMBLY
Oscar A. Morgenstern, Lindenhurst, N.Y., assignor to Kollsman Instrument Corp., Elmhurst, N.Y., a corporation of New York
Filed May 15, 1962, Ser. No. 194,901
7 Claims. (Cl. 346—77)

My invention relates to a projector system and more particularly to a projector system for simultaneously displaying and plotting data wherein the plotting subsystem responds rapidly and accurately to input data while avoiding the need for gearing or worm drive control means and wherein the projection system produces a visual display of high resolution with high speed automatic slide changing ability.

Graphic representations developed for the purpose of analyzing data find large every day use in scientific, business and military applications to name just a few. Graphic representations for analysis purposes may be prepared in a variety of different ways. In order, however, to provide observation of the graphic plot concurrently with the plotting operation the most advantageous system has been found to be a combined electro-optical arrangement.

Having now determined that a combined electro-optical arrangement should be employed in the plotting operation, the basic problem is to determine what type of electro-optical arrangement should be employed which will enable the superimposition of graphic images upon one another by a plurality of such electro-optical devices. In the normal project systems presently in use, images are projected by imposing opaque objects in front of an illuminating source so that the projected image takes the form of a dark object upon an illuminated screen (i.e. a dark line on a white background). This presents the problem of destruction of the image from one projector by the light source of another projector, thereby, destroying the clarity of the superimposed images.

In order to overcome this disadvantage, it has been decided that the projection device be adapted to project a light image upon a dark screen (i.e. a light line on a dark background), which arrangement advantageously lends itself to superimposition of images from a plurality of projectors upon a single screen. Thus the arrangement decided upon which is embodied in the instant invention consists of an opaque coating and an associated scribing stylus wherein the stylus experiences translational motion under control of electrical input signals for the purpose of "scribing," or "scratching" (i.e. removing) the opaque coating of a transparent surface. The term "scribing stylus" employed herein is hereinafter intended to identify the means for removing (or scratching) of the opaque coating from a transparent substrate whereas the term "writing stylus" is hereinafter intended to identify the means for performing the act of writing upon a surface such as writing with ink upon a writing surface (i.e. paper). The portion of the opaque coating which has been removed by the scribing stylus is simultaneously optically projected upon a screen wherein the observation of the projected image takes place concurrently with the operation of the scribing stylus.

In order that the graph being developed may be observed continuously throughout the plotting operation the stylus used to generate the graph is secured to means which does not obstruct the light source employed to project the graphic plot upon a viewing screen.

The novel plotter projector is so designed as to provide accurate high speed graphic type plotting with concurrent projection of the plot being generated by the employment of suitable drive means which control the stylus motion in response to voltage input signals. The coating arrangement used provides a sharp image of the graph to be projected. This arrangement completely avoids all of the undesirable features inherent in a gear connected system such as those employed in prior art devices.

The device of the instant invention is comprised of a stylus mounting including a stylus, which mounting may be moved in a vertical plane by suitable means to provide movement in two mutually perpendicular directions. The stylus mounting permits light to pass therethrough thereby enabling the light to pass through the portions grooved away from the slide member so as to project an illuminated trace upon a suitable screen.

The opaque slide to be grooved preferably has an annular configuration the dimensions of which permit a plurality of separate scribes or plots to be scribed upon the slide.

The transparent substrate of the opaque slide means is treated with an opaque slide coating composition which provides better line definition, less stylus wear and freedom from skip. The annular slide is rotated by suitable means such as a servo-operated turret mechanism which includes an indexing means for positioning the slide at predetermined angular positions. Elements 72, 72a, 73, 74, 75, 78, 79 and 81 of the turret mechanism 70 with annular slide 71 (see FIGURE 2) are described in detail in the patents referred to elsewhere in this specification. The projection system includes a lens arrangement which is positioned to correct for trapezoidal effects and for equalizing final image sizes. A blower is arranged to cool the projector elements and to remove the opaque coating residue produced during the scribing operation.

One of the opaque coatings employed in prior art devices consisted of a coating material of carbon black which is impressed in any well known manner upon a transparent substrate (i.e. glass). This was found to be highly impractical due to instability causing the lines scribed therethrough to become jagged. This necessitates the employment of a protective lacquer which combination requires a large amount of power for driving the scribing stylus drive means.

This led to the development of the coating arrangement of the instant invention which is so adapted as to provide: a coating which is opaque and is easily removable by the stylus; requires substantially less power for the scribing operation in order to drive the scribing stylus; does not chip; is extremely thin; does not cause measurable stylus wear; and is relatively inexpensive in its manufacture.

The structure of the opaque slide consists of a glass (or equivalent) member which is employed for its advantageous features of transparency; hardness; optical flatness; and capability of being readily and simply coated. The coating arrangement consists of a first layer of a soft material which lends itself readily to a scribing operation which removes the soft material from the substrate; a second layer which provides the necessary opaqueness; and a third layer which acts as protective coating for the prevention of chemical or other harmful reactions.

It is therefore, one object of this invention to provide a data projector having a novel opaque slide which enables the scribing operation to be performed using a minimum amount of power.

Another object of this invention is to provide a data projector having a novel slide coating composition which enables the scribing operation to be performed with a minimum amount of scribing power while providing the necessary opaqueness.

Another object of this invention is to provide a scribing slide for a data projector which enables the scribing operation to be performed with a minimum of scribing power and which includes a protective layer for shielding the slide coating from any harmful chemical reactions.

Still another object of this invention is to provide a scribing slide arrangement for a data projector which includes a first layer which provides adequate opaqueness and a second layer which acts in the manner of a lubricant to facilitate scribing of the first layer.

These and other objects of the invention will become apparent when considering the following description and accompanying drawings in which:

FIGURE 2 is an exploded view showing selected ones of the components housed in the projector, assembly of FIGURE 1.

Figures 1, 3:
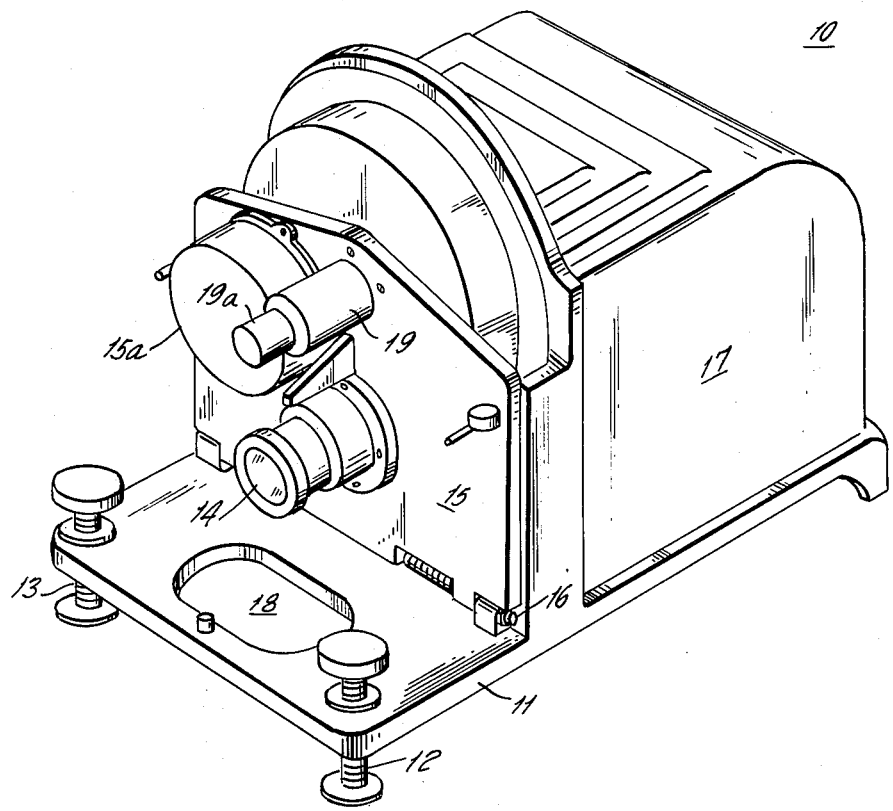
FIGURE 1 is a perspective view of the plotting projector assembly of my novel data projection system.
FIGURE 3 is a cross-sectional view of the opaque slide taken along line 27–27' of FIGURE 2.

Referring now to the drawings, FIGURE 1 shows a data projector 10 which is comprised of a base member 11. The rear portion of base 11 has positioned thereupon a housing 17 which houses the stylus and stylus driving means which generates the plot to be projected. A front plate 15 which is pivotally mounted to base 11 by hinge means 16 has mounted thereto a portion 14 of the data projector lens system which is employed to project a sharp image upon the data projector screen (not shown). A pair of adjustable legs, 12 and 13, are mounted through associated tapped holes in base 11 to permit vertical alignment of the plot being projected. The cover plate 15 may be readily opened for the purpose of either inspecting or repairing the data projector interior for corrective or preventive maintenance. An aperture, 18 is provided in base member 11 to allow sufficient clearance for lens mount 14 during the opening operation to protect the lens from breakage.

FIGURE 2 is an exploded view of the projector 10 shown in FIGURE 1 wherein selected ones of the elements within the projector housing 17 are shown in an exploded arrangement. The projector scribing stylus 103 is resiliently suspended by a suitable carriage assembly (not shown) which is described in detail in U.S. Patent No. 3,151,927, issued October 6, 1964, entitled Projected Tracking Display, by Walter Angst et al. and assigned to the assignee of the instant invention. It should be understood that the means described in issued Patent No. 3,151,927 sets forth one preferred arrangement for resiliently mounting a scribing stylus and that other arrangements may be employed if desired. Since the instant invention is concerned with the coating composition, the manner in which the opaque coating composition is grooved (mechanically, electro-mechanically, and so forth) is secondary in nature.

The operation of the carriage driving means and the manner in which the scribing stylus carriage operates are decribed in detail in U.S. Patent No. 3,151,927, issued October 6, 1964, "Projected Tracking Display," Walter Angst et al.; U.S. Patent No. 3,160,461, issued December 8, 1964, "Data Projector Turret Assembly," M. Wengryn et. al.; and U.S. Serial No. 195,871, filed May 18, 1962, "Data Projector Stylus Assembly," W. Angst et al., all assigned to the assignee of the instant invention, and which applications are incorporated herein by reference. A detailed decription will not be given since this operation lends no novelty to the instant invention, as will be more fully described.

The scribing stylus 103 is rigidly mounted to a frame 104 by means of first and second transparent plates 105 and 106 supported by frame 104. The stylus 103 passes through suitable openings in transpartnet plates 105 and 106 and is secured to these plates at these openings in any suitable manner. Because the plates are extremely thin they serve as resilient members which act as cushioning means for the absorption of any inmpact created in the scribing mode. Thus, the two glass plates 105 and 106 are employed in order to provide adequate support for the scribing stylus 103, while at the same time providing sufficient mounting resiliency.

A light source 110 cooperates with a reflective member 111 and lenses 112 to focus light rays passing in a direction substantially parallel to the phantom line 113 through the stylus mounting frame 104, opaque slide member 71 and a final focusing lens 114, so as to be ultimately projected upon a suitable screen. The actual details of the mounting, the stylus driving means and the lens facusing system are set forth in detail in the above mentioned patents assigned to the assignee of the instant invention. For the purposes of the instant invention it suffices to understand that the point of stylus 103 bears against the opaque coating composition with a force sufficient to scratch or groove away all of said layers to develop the aforementioned trace. The cooperation between the opaque slide member and the stylus 103 can best be seen from a consideration of FIGURE 3. Movement of the stylus mounting frame 104 in the horizontal and vertical direction, as shown by arrows 115 and 116, respectively, permits any form of a two-dimensional trace to be scratched upon the slide member. This is also brought out in detail in the above mentioned isssed U.S. patents and the type of trace actually developed lends no novelty to the instant invention.

The frame for mounting the two glass plates which support the stylus 103 is capable of moving to either one of two positions. In a first position the plates move toward the opaque member 71 for the purpose of describing a plot on the surface of the annular slide and in the second position the glass plates move away from the opaque slide in order to permit either the slide 71 to be rotated without a scribing action or to permit positioning of the scribing stylus 103 without making an accompanying ing scribing line on the surface of the opaque slide 71. These movements of the scribing stylus take place along the longitudinal axis shown by the phantom line extending from the upper right hand end of the lower left hand end of FIGURE 2. A detailed description of the manner of operation of the scribing stylus 103 will be omitted as the above mentioned co-pending U.S. applications provide a detailed description of the operation and it suffices for the purpose of the instant invention to understand that the scribing stylus 103 is movable out of or into engagement with the annular opaque member 71 for the purpose of scribing a line or curve in the opaque surface thereof. Since the instant invention deals only with the coating provided on the annular slide 71 this coating may be used with any other scribing apparatus and is not limited exclusively to the scribing apparatus described in the above mentioned co-pending applications.

The slide coating composition of the annular slide 71 as shown in FIGURE 3, which is a cross-section of the opaque slide, consists of a glass layer 403 having a primary coating of lead, indium or other equivalent material impressed thereon. The primary coating 402 has the characteristics of a low melting point, spreading quite uniformly during the depositing operation and a low degree of ionization. The thickness of the primary coating 402 is provided for acting as a lubricant beneath secondary coating 401 and is approximately 10% of the total thickness of the entire coating arrangement T. The secondary coating 401 which may be a coating of aluminum or equivalent is employed to provide the necessary feature of opaqueness so as to supplement the relatively high light transmission characteristic of the primary coating 402. It was found that use of the secondary coating alone required substantially more scribing power than the primary-secondary coatings of the instant invention. It has been found that metals such as aluminum, molybdenum, and silver, for example, may be substituted in place of aluminum, as long as the metals used have a high degree of purity. It has been found that during the scribing operation the undercoating 402 acts as a lubricant beneath the secondary coating 401 so that the removal or scribing operation of these coatings by scribing stylus 103 is substantially smoother than the scribing of the secondary coating in the absence of the primary coating as described above. A single layer of the secondary coating has the disadvantage of producing a jagged line during the scribing operation giving a "snow plow" effect whereas the employment of the primary coating beneath the ssecondary coating obviates these disadvantages. The thickness of the secondary coating is of the order of 80% of the total thickness T of the coating arrangement impressed upon the substrate 403.

A third coating or layer 400 may consist of a magnesium fluoride or equivalent composition. This layer has the characteristic of being extremely thin and having a high degree of toughness due to the dimensions of the layer. The toughness however, is insufficient to impair the scribing operation. This coating acts as a protective means to prevent chemical or other harmful reactions to take place with the primary and secondary layers. The third coating may have tany thickness but a thickness of the order of 5% of the total thickness T found desirable in some cases. Although the third layer provides protection against any chemical reactions, it has been found that desirable results have been procured in the absence of the third coating and the choice of the presence or absence of this layer depends strictly upon the needs of the user. It has been found that this process of slide coating provides a better composition; excellent line resolution, less stylus wear, complete freedom from skipping and line uniformity when scribed by the stylus 103.

Although I have described preferred embodiments of our novel invention, many variations and modifications will now be obvious to those skilled in the art, and I prefer therefore, to be limited not by the specific disclosure herein but only by the appended claims.

I claim:

1. A scribing slide having an opaque coating composition for use in a data projector having a movably mounted stylus for removing said coating composition in scribing said slide member; the improvement comprising including in said coating a top layer; a sub-layer of a metallic lubricating material for changing the cohesiveness of the coating composition; to thereby improve the fracture resistance of the coating and the light definition produced by the stylus.

2. A data projector comprising a light transmissive member; an opaque layer on said light transmissive member; a sub-layer between said light transmissive member and said opaque layer for improving the fracture resistance of the coating comprised of said opaque and sub-layers; movably mounted stylus means for removing said opaque and sub-layers to form a trace upon said coating.

3. The projector of claim 2 wherein said light transmissive member has an annular configuration.

4. The projector of claim 2 further comprising a third layer deposited upon said opaque layer to protect said opaque layer from harmful foreign matter.

5. The projector of claim 2 wherein said sub-layer is chosen from the group comprised of lead and indium.

6. The projector of claim 5 wherein said opaque layer is chosen from the group comprised of molybdenum, silver and aluminum.

7. The projector of claim 4 wherein said third layer is magnesium fluoride.

References Cited by the Examiner

UNITED STATES PATENTS

| | | | |
|---|---|---|---|
| 1,255,202 | 2/1918 | Messiter | 346—135 X |
| 1,319,820 | 10/1919 | Williams | 88—24 |
| 1,438,403 | 12/1922 | Scherler | 346—135 |
| 2,000,527 | 5/1935 | Linderman | 346—135 |
| 2,413,300 | 12/1946 | Dunn et al. | 88—24 |
| 2,859,659 | 11/1958 | Fenske et al. | 88—24 |
| 2,897,038 | 1/1959 | Vonnegut | 346—135 X |
| 2,935,369 | 5/1960 | Mignone et al. | 346—135 |
| 3,122,448 | 2/7964 | Hills et al. | 346—135 X |

FOREIGN PATENTS 507,159   6/1920   France.

LEO SMILOW, *Primary Examiner.*

EMIL G. ANDERSON, LEYLAND M. MARTIN,
*Examiners.*